United States Patent
Chen

(10) Patent No.: US 10,756,447 B2
(45) Date of Patent: Aug. 25, 2020

(54) COMMUNICATION TERMINAL DEVICE APPLICABLE TO AERIAL VEHICLE AND MOBILE COMMUNICATION METHOD USING THE SAME

(71) Applicant: INDUSTRIAL TECHNOLOGY RESEARCH INSTITUTE, Hsinchu (TW)

(72) Inventor: Yung-Han Chen, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 156 days.

(21) Appl. No.: 15/832,067

(22) Filed: Dec. 5, 2017

(65) Prior Publication Data
US 2019/0173201 A1 Jun. 6, 2019

(30) Foreign Application Priority Data
Dec. 1, 2017 (TW) .............................. 106142284 A

(51) Int. Cl.
*H01Q 25/04* (2006.01)
*H01Q 25/00* (2006.01)
(Continued)

(52) U.S. Cl.
CPC ............ *H01Q 25/04* (2013.01); *H01Q 3/005* (2013.01); *H01Q 3/24* (2013.01); *H01Q 3/28* (2013.01);
(Continued)

(58) Field of Classification Search
CPC ...... H01Q 25/04; H01Q 25/005; H01Q 3/005; H01Q 3/24; H01Q 3/28; H04B 7/26; H04B 15/02
See application file for complete search history.

(56) References Cited

U.S. PATENT DOCUMENTS 9,363,690 B1 6/2016 Singh et al.
9,545,995 B1* 1/2017 Chau .................... B64C 39/024
(Continued)

FOREIGN PATENT DOCUMENTS

CN 105594233 A 5/2016
CN 205787905 U 12/2016
(Continued)

OTHER PUBLICATIONS

Taiwanese Office Action and Search Report for Taiwanese Application No. 106142284, dated May 28, 2018.
(Continued)

*Primary Examiner* — Hoang V Nguyen
(74) *Attorney, Agent, or Firm* — Birch, Stewart, Kolasch & Birch, LLP

(57) ABSTRACT

A communication terminal device is applicable to an aerial vehicle. The communication terminal device includes an antenna, an altimeter and a processing circuit. The antenna is configured to provide a transceiving range of electromagnetic waves. The flight height detector is configured to obtain an altitude measurement value adapted to specify an altitude of the aerial vehicle. The processing circuit is coupled to the altimeter and is configured to: determine whether the altitude measurement value exceeds a height threshold value; set the transceiving range of electromagnetic waves of the antenna to be omni-directional in response to determining that the altitude measurement value does not exceed the height threshold value; in response to determining that the altitude exceeds the height threshold value, execute an antenna beam width adjusting mechanism, so that the transceiving range of electromagnetic waves of the antenna is shaped into a directional beam.

12 Claims, 6 Drawing Sheets

(51) Int. Cl.
*H01Q 3/28* (2006.01)
*H01Q 3/00* (2006.01)
*H01Q 3/24* (2006.01)
*H04B 7/185* (2006.01)
*B64C 39/02* (2006.01)

(52) U.S. Cl.
CPC ....... *H01Q 25/005* (2013.01); *H04B 7/18506* (2013.01); *B64C 39/024* (2013.01); *B64C 2201/146* (2013.01)

(56) References Cited

U.S. PATENT DOCUMENTS

| | | |
|---|---|---|
| 9,622,133 B1 | 4/2017 | Guvenc |
| 2012/0313771 A1* | 12/2012 | Wittliff, III ......... G07C 5/0808 340/441 |
| 2013/0182790 A1 | 7/2013 | Jalali et al. |
| 2014/0333491 A1 | 11/2014 | Behroozi et al. |
| 2015/0236778 A1 | 8/2015 | Jalali |
| 2015/0236779 A1 | 8/2015 | Jalali |
| 2015/0294308 A1 | 10/2015 | Pauker et al. |
| 2016/0013858 A1 | 1/2016 | Jalali et al. |
| 2016/0105233 A1 | 4/2016 | Jalali |
| 2016/0226573 A1 | 8/2016 | Behroozi |
| 2017/0150373 A1 | 5/2017 | Brennan et al. |
| 2017/0208489 A1 | 7/2017 | Djordjevic et al. |

FOREIGN PATENT DOCUMENTS

| | | |
|---|---|---|
| CN | 106908822 A | 6/2017 |
| CN | 107113053 A | 8/2017 |
| TW | I584663 B | 5/2017 |

OTHER PUBLICATIONS

Asadpour et al., "From Ground to Aerial Communication: Dissecting WLAN 802.11n for the Drones," 8th ACM International Workshop on Wireless Network Testbeds, Experimental Evaluation and Characterization (WinTech 2013), Sep. 30, 2013, pp. 25-32.

Gupta et al., "Survey of Important Issues in UAV Communication Networks," IEEE Communications Surveys and Tutorials, vol. PP, Issue 99, Nov. 2015, pp. 1-32.

Merwaday et al., "UAV Assisted Heterogeneous Networks for Public Safety Communications," IEEE Wireless Communications and Networking Conference (WCNC)—Workshops—2nd International Workshop on Device-to-Device and Public Safety Communications, 2015, pp. 329-334.

Park et al., "Handover Management of Net-Drones for Future Internet Platforms," International Journal of Distributed Sensor Networks, vol. 2016, Article ID 5760245, 2016, pp. 1-9.

Sharma et al., "UAV-Assisted Heterogeneous Networks for Capacity Enhancement," IEEE Communications Letters, arXiv:1604.02559v1 [cs.NI], 2016 (Submitted Apr. 9, 2016), pp. 1-4 (5 pages total).

Zeng et al., "Wireless Communications with Unmanned Aerial Vehicles: Opportunities and Challenges," Draft submitted to IEEE Communications Magazine, arXiv:1602.03602v1 [cs.IT], Dated: Feb. 12, 2016 (Submitted Feb. 11, 2016), pp. 1-15 (16 pages total).

* cited by examiner

COMMUNICATION TERMINAL DEVICE APPLICABLE TO AERIAL VEHICLE AND MOBILE COMMUNICATION METHOD USING THE SAME

This application claims the benefit of Taiwan application Serial No. 106142284, filed Dec. 1, 2017, the subject matter of which is incorporated herein by reference.

TECHNICAL FIELD

The invention relates to a communication terminal device and a mobile communication method using the same, and more particularly to a communication terminal device applicable to an aerial vehicle and a mobile communication method using the same.

BACKGROUND

The application of ordinary light aerial vehicle, such as unmanned aerial vehicle (UAV), performing instant data transfer through a broadband mobile communication network starts to receive people's attention. This is because the ground base stations of terrestrial mobile communication network (such as 3G/4G/5G mobile communication network) have been configured at a high density, and an aerial vehicle flying under an regulatory altitude limit (such as 400 feet in most countries) is still within the coverage of the 3G/4G/5G terrestrial mobile networks and therefore can perform wireless transmission operation such as flight control and transmissions of image, video, or data.

However, when an UAV performs communication through a terrestrial mobile communication network during the flight, the overlap region between signal coverages of the base stations could increase as the altitude increases due to less obstacles, resulting in more overlaps of radio coverages. Under such circumstance, the communication of the UAV will be interfered by more base stations, such that some effects, e.g. handover confusion and communication instability, are induced.

SUMMARY

The invention is directed to a communication terminal device applicable to an aerial vehicle and a mobile communication method using the same. When the aerial vehicle performs communication with a ground mobile communication network, the transceiving range of electromagnetic waves of the antenna is automatically adjusted according to the altitude and/or the signal quality index to reduce signal interference from and toward neighboring or other irrelevant base stations.

According to one embodiment of the present invention, a communication terminal device applicable to an aerial vehicle is provided. The communication terminal device can perform wireless communication with a terrestrial mobile communication network. The communication terminal device includes an antenna, an altimeter and a processing circuit. The antenna is configured to provide a transceiving range of electromagnetic waves. The altimeter is configured to obtain an altitude measurement value adapted to specify an altitude of the aerial vehicle. The processing circuit coupled to the antenna and the altimeter is configured to: determine whether the altitude measurement value exceeds a height threshold value; set the transceiving range of electromagnetic waves of the antenna to be omni-directional in response to determining that the altitude measurement value does not exceed the height threshold value, such that the transceiving range of electromagnetic waves includes directions above and under a horizontal plane parallel to the Earth's surface; execute an antenna beam width adjusting mechanism to shape the transceiving range of electromagnetic waves of the antenna into a beam which is directional in response to determining that the altitude measurement value exceeds the height threshold value, such that the transceiving range of electromagnetic waves only includes directions under the horizontal plane parallel to the Earth's surface.

According to another embodiment of the present invention, a mobile communication method of a communication terminal device applicable to an aerial vehicle is provided. The communication terminal device is applicable to an aerial vehicle and is configured to perform wireless communication with a terrestrial mobile communication network through an antenna. The mobile communication method includes following steps: An altitude measurement value adapted to specify an altitude of the aerial vehicle is obtained. Whether the altitude measurement value exceeds a height threshold value is determined. The transceiving range of electromagnetic waves of the antenna is set to be omni-directional in response to determining that the altitude measurement value does not exceed the height threshold value, such that the transceiving range of electromagnetic waves includes directions above and under a horizontal plane parallel to the Earth's surface. An antenna beam width adjusting mechanism is executed to shape the transceiving range of electromagnetic waves of the antenna into a beam which is directional in response to determining that the altitude measurement value exceeds the height threshold value, such that the transceiving range of electromagnetic waves only includes directions under the horizontal plane parallel to the Earth's surface.

The above and other aspects of the invention will become better understood with regard to the following detailed description of the preferred but non-limiting embodiment(s). The following description is made with reference to the accompanying drawings.

DETAILED DESCRIPTION

The present invention provides a communication terminal device applicable to an aerial vehicle and a mobile communication method using the same. The communication terminal device of the present invention refers to a user equipment (UE) or other communication device served as a downlink receiver or an uplink transmitter with respect to a ground base station. The communication terminal device can perform wireless communication with a terrestrial mobile communication network. The terrestrial mobile communication network refers to a network providing mobile communication service to the communication terminal device through the base station or wireless radio transceiver equipment configured on the ground. The communication terminal device can be configured on or embedded in an aerial vehicle (such as a remote drone, an unmanned aerial vehicle beyond visual line of sight, or an automatic drone) and used as a medium of wireless communication between the equipment on the aerial vehicle and the ground base station. The communication terminal device may dynamically adjust the transceiving range of electromagnetic waves of the antenna according to the altitude measurement value and/or the signal quality index to avoid the communication between the aerial vehicle and the ground base station being interfered by neighboring or other irrelevant base stations during the flight of the aerial vehicle.

Figure 1:
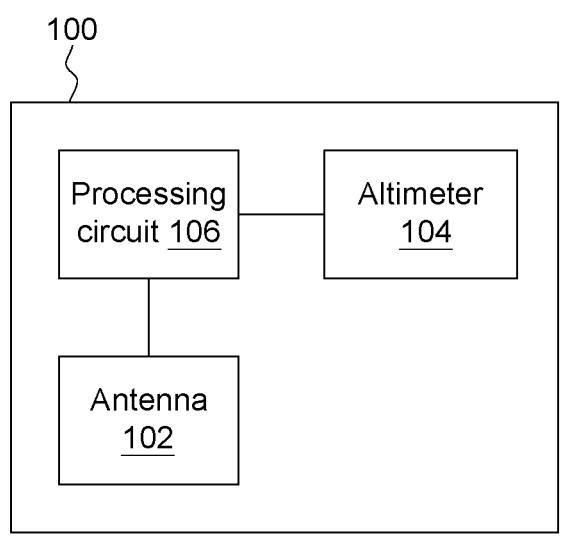
FIG. 1 shows a block diagram of a communication terminal device applicable to an aerial vehicle according to an embodiment of the present invention.

FIG. 1 shows a block diagram of a communication terminal device 100 applicable to an aerial vehicle according to an embodiment of the present invention. The communication terminal device 100 includes an antenna 102, an altimeter 104 and a processing circuit 106. The antenna 102, for example, can be realized by an antenna having a beam adjusting mechanism (such as one or more than one angle adjustable baffle of electromagnetic waves), an antenna array formed of multiple antenna units, or a beamformer. The altimeter 104, which, for example, can be realized based on a barometer or a global positioning system (GPS), is configured to obtain an approximate height of the aerial device or obtain a more precise altitude measurement value through an optical distance measuring device (such as a laser rangefinder). The processing circuit 106 can be realized by a microcontroller, a microprocessor, a digital signal processor, an application specific integrated circuit (ASIC), a digital logic circuit, field programmable gate array (FPGA), or other electronic circuit having computation function.

The antenna 102, which can be realized by one or more than one independent antenna or antenna array, is configured to provide a transceiving range of electromagnetic waves. The altimeter 104 is configured to obtain an altitude measurement value adapted to specify an altitude of the aerial vehicle. The processing circuit 106 is coupled to the antenna 102 and the altimeter 104 and is configured to execute a mobile communication method of an embodiment of the present invention. The mobile communication method, for example, includes following steps: Whether the altitude measurement value exceeds a height threshold value is determined. The transceiving range of electromagnetic waves of the antenna 102 is set to be omni-directional in response to determining that the altitude measurement value does not exceed the height threshold value, such that the transceiving range of electromagnetic waves includes the directions above and under the horizontal plane parallel to the Earth's surface. An antenna beam width adjusting mechanism is executed to shape the transceiving range of electromagnetic waves of the antenna 102 into a directional beam in response to determining that the altitude measurement value exceeds the height threshold value, such that the transceiving range of electromagnetic waves only includes the directions under the horizontal plane parallel to the Earth's surface. The directions under the horizontal plane of the aerial vehicle refer to the directions proceeding toward the ground.

In an embodiment, the processing circuit 106 adjusts the transceiving range of electromagnetic waves of the antenna 102 by a mechanical method and/or an electronic method. The mechanical method, for example, can be realized by driving a mechanical motor to move a metal baffle, a mechanism or an element of the antenna 102 to a specific angle or position or adjusting a radio frequency lens (RF lens) to change the transceiving range of electromagnetic waves of the antenna 102 (the field type of antenna). The electronic method, for example, can be realized by feeding signals having specific phase difference to the antenna units of the antenna array to form a specific field type of antenna.

Figure 2:
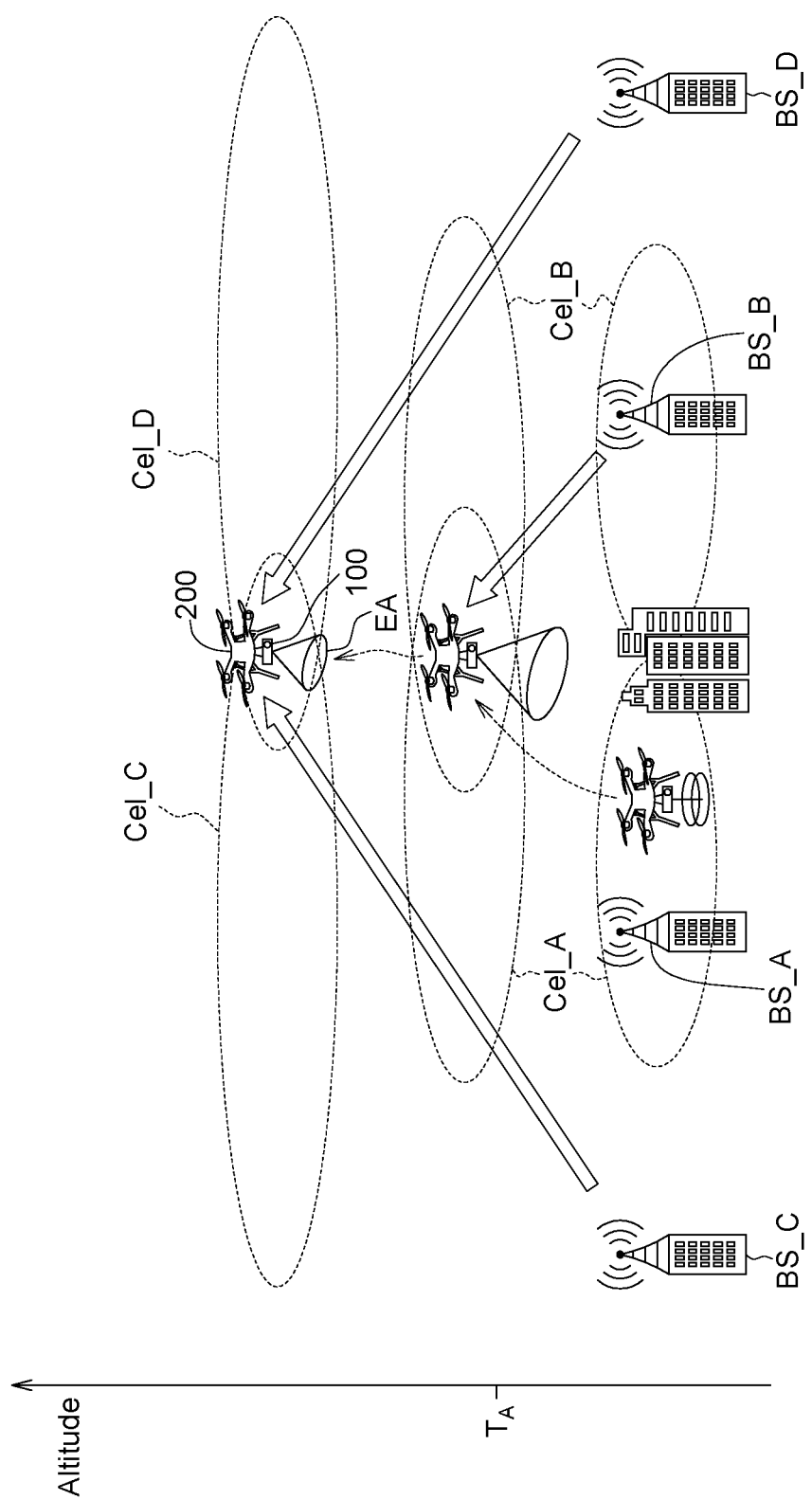
FIG. 2 schematically shows how a communication terminal device configured on an aerial vehicle adjusts a transceiving range of electromagnetic waves according to an altitude of the aerial vehicle.

FIG. 2 schematically shows how a communication terminal device 100 configured on an aerial vehicle 200 adjusts a transceiving range of electromagnetic waves according to an altitude of the aerial vehicle 200.

Refer to FIG. 2. When the aerial vehicle 200 has an altitude lower than the height threshold value TA, the transceiving range EA of electromagnetic waves of the communication terminal device 100 is set to be omni-directional (represented by round discs in solid lines). When the altitude measurement value of the aerial vehicle 200 is larger than or equivalent to the height threshold value TA, the communication terminal device 100 executes an antenna beam width adjusting mechanism, such that the transceiving range of electromagnetic waves EA switches to a directional beam proceeding towards the ground (represented by cones in solid lines). Also, when the altitude measurement value of the aerial vehicle 200 is larger than or equivalent to the height threshold value TA (that is, during the period of executing the antenna beam width adjusting mechanism), the communication terminal device 100 further dynamically adjusts the beam width of the antenna 102 such that the beam width narrows as the altitude measurement value increases.

Through the adjustment exemplified above, the signal interference, which is caused by neighboring or irrelevant base stations, to the communication terminal device 100 configured on the aerial vehicle 200 may be avoided effectively. Furthermore, conventional base stations are configured on the ground to serve the user equipment configured on the ground or the user equipment configured within the buildings, so the signal coverage is optimized according to the terrains and the obstructions on the ground. As indicated in FIG. 2, when the coverages Cel_A and Cel_B of two neighboring base stations BS_A and BS_B are at a height close to the ground, the coverages Cel_A and Cel_B are respectively optimized according to the fixed obstructions (such as buildings) to reduce overlapping coverage.

However, as the altitude of the aerial vehicle 200 increases, the communication terminal device 100 configured on the aerial vehicle 200 will more likely to be interfered by neighboring or remote non-neighboring base stations due to the decrease of obstructions. Refer to FIG. 2. Suppose the aerial vehicle 200 is originally serviced by the base station BS_A near the ground. As the altitude increases (for example, the altitude is larger than the height threshold value $T_A$), the aerial vehicle 200 will fall within both the signal coverage Cel_A of the base station BS_A and the signal coverage Cel_B of the base station BS_B. Meanwhile, the communication terminal device 100 will suffer severer signal interference. Furthermore, as the altitude of the aerial vehicle 200 increases again, the communication terminal device 100 may further be interfered by the signals of the non-neighboring base stations BS_C and BS_D directly or indirectly (such as through ground reflection). For example, the communication terminal device 100 falls within the signal coverage Cel_C of the base station BS_C and the signal coverage Cel_D of the base station BS_D.

Therefore, according to in an embodiment of the present invention, when it is detected that the altitude measurement value is lower than the height threshold value $T_A$, the communication terminal device 100 will plan the antenna 102 to be omni-directional, such that the communication terminal device 100 can be configured to use the optimized ground network like the user equipment uses. When it is detected that the altitude measurement value exceeds the height threshold value $T_A$, the communication terminal device 100 will plan the antenna 102 to be ground-directional to communicate with the ground base station (such as base station BS_A) to reduce or avoid signal interference caused by neighboring base stations (such as base station BS_B) or remote base stations (such as base stations BS_C and BS_D).

Figure 3:
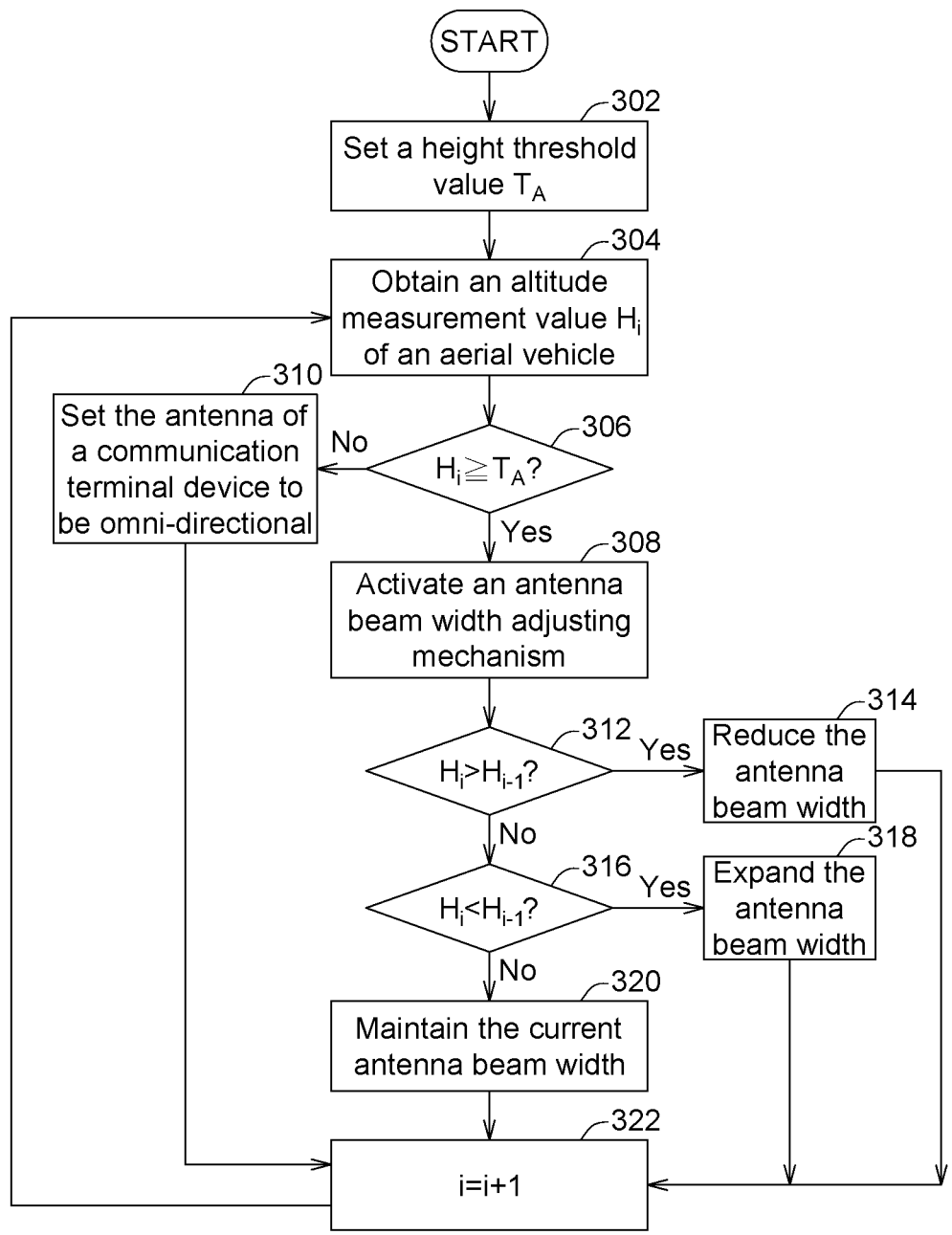
FIG. 3 shows flowchart of a mobile communication method of a communication terminal device according to an embodiment of the present invention.

FIG. 3 shows flowchart of a mobile communication method of a communication terminal device 100 according to an embodiment of the present invention. The communication terminal device 100, for example, is configured on the aerial vehicle 200. Firstly, the method begins at step 302, a height threshold value $T_A$ is set by the original manufacturer or the user. Then, in step 304, an altitude measurement value $H_i$ corresponding to the i-th time point is obtained, wherein i is an integer, and the i-th time point represents a current time point or a specific time point.

The attitude measurement value $H_i$ can be used to represent the altitude of the aerial vehicle 200 or the communication terminal device 100 at the i-th time point. In an exemplary example, the measurement result obtained by the altimeter 104 at a single time point (such as the i-th time point) can be directly used as an altitude measurement value $H_i$. Or, a statistical result of the altitude measurement values obtained over a period of time can be used as an altitude measurement value $H_i$. For example, the average of the altitude measurement values obtained from the (i−k+1)-th time point to the i-th time point is used as an altitude measurement value $H_i$ corresponding to the i-th time point, wherein k is a positive integer smaller than or equivalent to i.

In step 306, whether the altitude measurement value $H_i$ corresponding to the i-th time point is larger than or equivalent to a height threshold value $T_A$ is determined. If it is determined that the altitude measurement value $H_i$ is larger than or equivalent to the height threshold value $T_A$, then the method proceeds to step 308, an antenna beam width adjusting mechanism is activated. If it is determined that the altitude measurement value $H_i$ is smaller than the height threshold value $T_A$, then the method proceeds to step 310, the antenna 102 is set to be omni-directional. After step 310 is executed, the method proceeds to step 322 for determining the value of the altitude measured at the next time point i+1.

According to the example illustrated in FIG. 3, the antenna beam width adjusting mechanism includes adjusting the beam width of the antenna 102 according to the altitude measurement value $H_i$. The processing circuit 106 may compare the altitude measurement value $H_i$ corresponding to the i-th time point with the altitude measurement value $H_{i-1}$ corresponding to the (i−1)-th time point to determine whether the aerial vehicle 200 is in an ascending state or a descending state, and then adjusts the beam width of the antenna 102 according to the result of determination, wherein the (i−1)-th time point is earlier than the i-th time point.

Refer to FIG. 3. In step 312, if the comparison of altitude measurement values is determined as $H_i>H_{i-1}$, this implies that the aerial vehicle 200 is in an ascending state. Meanwhile, if the beam width of the antenna 102 has not yet been reduced to the limit of a reducible range, then the beam width of the antenna 102 will be reduced in step 314. Conversely, in step 316, if the comparison of altitude measurement values is determined as $H_i<H_{i-1}$, this implies that the aerial vehicle 200 is in a descending state. Meanwhile, if the beam width of the antenna 102 has not yet been expanded to the limit of an expandable range, then the beam width of the antenna 102 will be expanded in step 318. The limit of the reducible range and the limit of the expandable range are determined according to the physical limitations of the beam width of the antenna 102 adjusted by a mechanical method and/or an electronic method. Or, the limit of the reducible range and the limit of the expandable range are self-defined default values.

If the comparison of altitude measurement values is determined as $H_i=H_{i-1}$, this implies that the altitude of the aerial vehicle 200 almost does not change, and the current beam width of the antenna will remain unchanged in step 320. After the execution of the antenna beam width adjusting mechanism at the i-th time point is completed, the method proceeds to step 322, the judgement of the next stage is performed at the next time point, that is, the (i+1)-th time point.

In the example illustrated in FIG. 3, steps 308, 312, 314, 316, 318, and 320 can, for example, be regarded as part of the antenna beam width adjusting mechanism.

Figure 4:
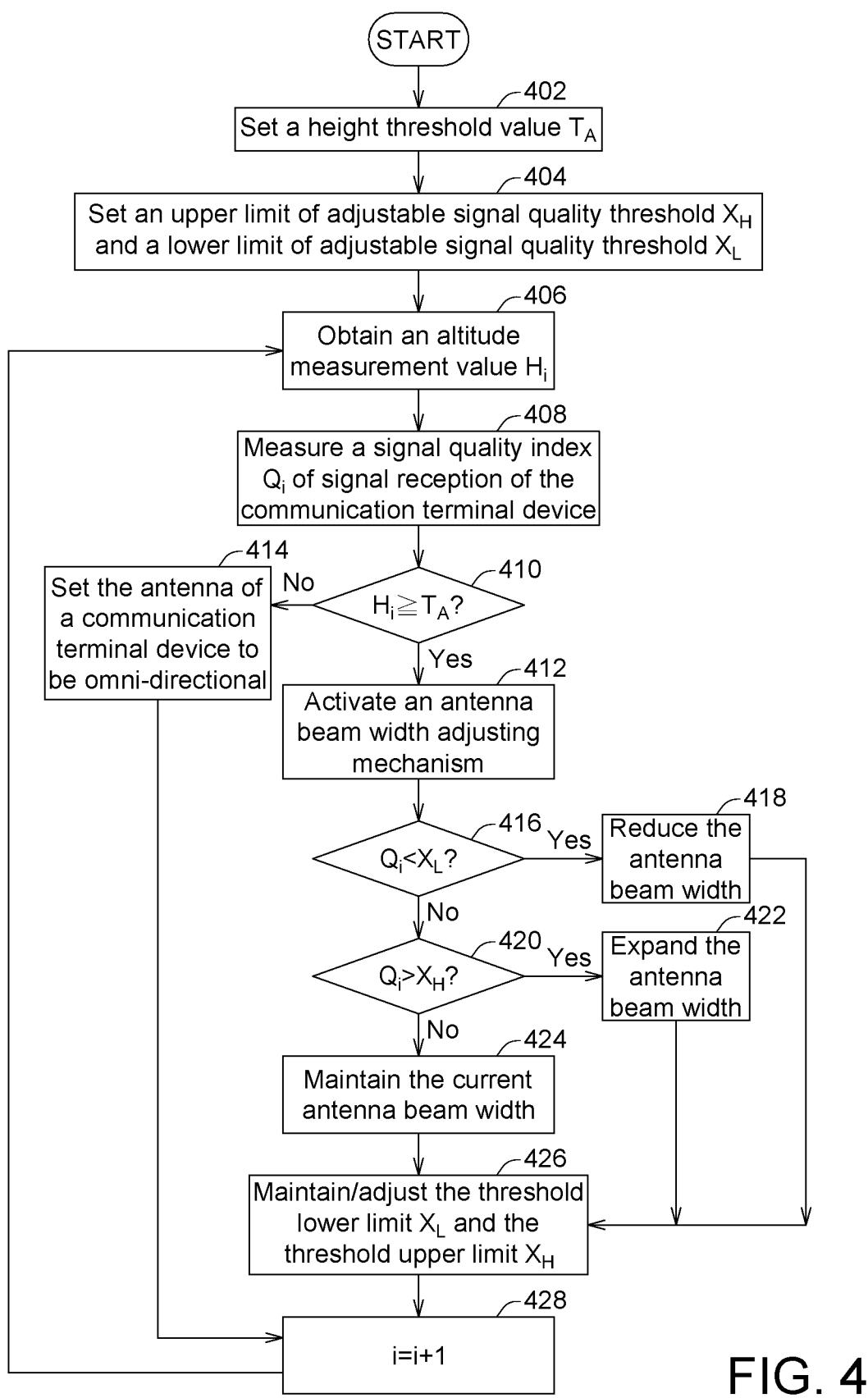
FIG. 4 shows flowchart of a mobile communication method of a communication terminal device according to another embodiment of the present invention.

FIG. 4 shows flowchart of a mobile communication method of a communication terminal device 100 according to another embodiment of the present invention. In the present embodiment, the antenna beam width adjusting mechanism includes adjusting the beam width of the antenna 102 according to the signal quality index of signal reception of the communication terminal device.

Refer to FIG. 4. In step 402, a height threshold value $T_A$ is set. In step 404, an upper limit of adjustable signal quality threshold $X_H$ and a lower limit of adjustable signal quality threshold $X_L$ are set. The height threshold value $T_A$, the signal quality threshold upper limit $X_H$, and the signal quality threshold lower limit $X_L$ can be set by the original manufacturer or the user.

In step 406, the altitude measurement value $H_i$ corresponding to the i-th time point is obtained, wherein the attitude measurement value $H_i$ can be adapted to specify the altitude of the aerial vehicle 200 or the communication terminal device 100 at the i-th time point.

In step 408, a signal quality index $Q_i$ of signal reception of the communication terminal device 100 at the i-th time point is measured. Examples of signal quality index $Q_i$ includes received signal strength indicator (RSSI), signal-to-noise ratio (SNR), reference signal received power (RSRP), and reference signal received quality (RSRQ). Here, the reference signal can be a pilot signal, a beacon signal, or a preamble signal. The mechanism for measuring the signal quality of the received signal normally is inbuilt in the communication device (such as the communication terminal device 100). Moreover, the communication terminal device 100 can also analyze and obtain the number of base stations through the analysis of signal measurement.

In step 410, like the step 306 of FIG. 3, whether the altitude measurement value $H_i$ corresponding to the i-th time point is larger than or equivalent to the height threshold value $T_A$ is determined. If it is determined that the altitude measurement value $H_i$ is larger than or equivalent to the height threshold value $T_A$, then the method proceeds to step 412, the antenna beam width adjusting mechanism is activated. If it is determined that the altitude measurement value $H_i$ is smaller than the height threshold value $T_A$, then the method proceeds to step 414, the antenna 102 of the communication terminal device 100 is set to be omni-directional to receive signals from the base station in all directions like the user equipment configured on the ground. After step 414 is executed, the method proceeds to step 428, the measurement result at the next time point i+1 is determined.

According to the example illustrated in FIG. 4, the antenna beam width adjusting mechanism includes adjusting the beam width of the directional beam according to the signal quality index $Q_i$ of the aerial vehicle 200. If the signal quality index $Q_i$ satisfies the first condition and the beam width has not yet been reduced to the limit of a reducible range, the processing circuit 106 will reduce the beam width of the antenna 102. If the signal quality index $Q_i$ satisfies the second condition and the beam width has not yet been expanded to the limit of an expandable range, the processing circuit 106 will expand the beam width of the antenna 102. The first condition and the second condition are set according to the definition of the signal quality index $Q_i$. The first condition being satisfied means that the quality of the signals currently measured is inferior to the quality of the signals previously measured. The second condition being satisfied means that the quality of the signals currently measured is superior to the quality of the signals previously measured. For example, suppose that the signal quality index $Q_i$ is represented by SNR. Then, the first condition refers to the signal quality index $Q_i$ being lower than a threshold lower limit, and the second condition refers to the signal quality index $Q_i$ being higher than a threshold upper limit.

Refer to FIG. 4. In step 416, if the comparison is determined as the signal quality index Qi<XL, where XL is the lower limit of adjustable signal quality threshold, this implies that the communication terminal device 100 may be interfered by the signals of irrelevant base stations and therefore end up with poor signal quality. Meanwhile, if the beam width of the beam of the antenna 102 has not been reduced the limit of a reducible range, then the antenna 102 is controlled to reduce the beam width in step 418. Conversely, in step 420, if the comparison is determined as the signal quality index Qi>XH, where XH is the upper limit of adjustable signal quality threshold, this implies that the signal quality of the communication terminal device 100 improves. Meanwhile, if the beam width of the antenna 102 has not yet been expanded to the limit of an expandable range, then the antenna 102 is controlled to expand the beam width in step 422.

If the signal quality index $Q_i$ is between $X_L$ and $X_H$, this implies that there is nil or insignificant change in the signal quality index $Q_i$, then the antenna 102 is controlled to maintain the current beam width in step 424.

In step 426, the processing circuit 106, in response to the change in an adjustment request of the communication terminal device 100, may further adjust at least one of $X_L$ and $X_H$ to comply with the communication specifications as required in different modulation types. In an embodiment as indicated in step 426, the processing circuit 106 does not adjust $X_L$ or $X_H$, but maintains the current $X_L$ and $X_H$ unchanged.

After the antenna beam width adjusting mechanism executed at the i-th time point is completed, the method proceeds to step 428, the judgement of the next stage is performed at the next time point, that is, the (i+1)-th time point.

In the example illustrated in FIG. 4, steps 412, 416, 418, 420, 422, 424, and 426 can be regarded as part of the antenna beam width adjusting mechanism.

It should be noted that the method disclosed above does not need to be executed in sequence (or any specific sequence). Also, the activities of the method disclosed above can be executed in series or in parallel.

Figure 5:
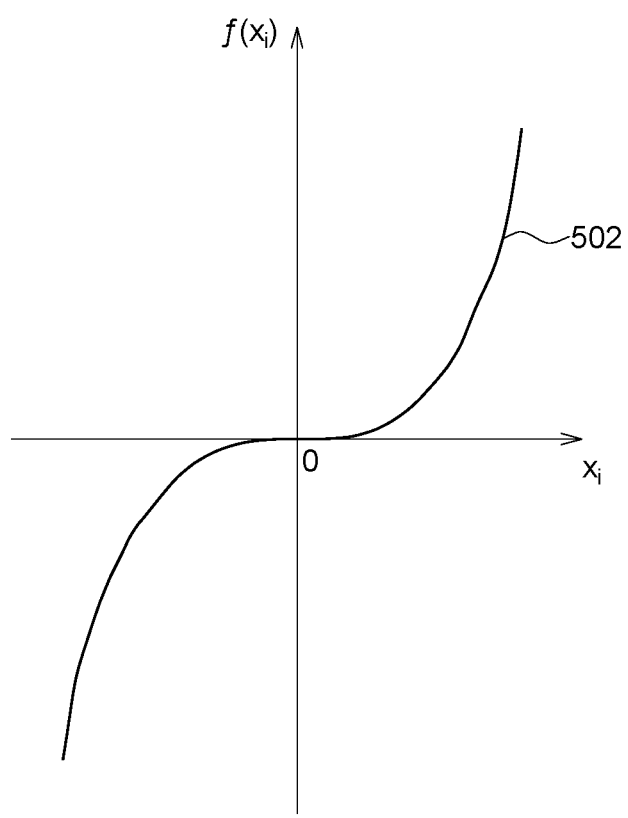
FIG. 5 shows a mapping relationship chart of beam width vs adjustment of signal quality index.

In an embodiment, the processing circuit 106 adjusts the beam width of the antenna 102 according to a function related to a signal quality index. Referring to FIG. 5, a mapping relationship chart of beam width vs adjustment of signal quality index is shown. According to the example illustrated in FIG. 5, the beam width W of the antenna 102 can be adjusted according to the following formula:

$$W=\Phi \times f(AVG(Q_i)-X) \quad \text{(formula 1)}$$

Wherein $\Phi$ represents a step adjustment of beam width;

$$AVG(Q_i) = \frac{1}{L}\sum_{k=i-L+1}^{i} Q_k;$$

L represents an average sampling length of the signal quality; X represents a predetermined deviation.

Curve 502 describes the relationship between the independent variable $x_i$ and the dependent variable $f(x_i)$ of the function $f(\cdot)$ described in formula 1. If the average of the signal quality improves over a period of time, then the antenna 102 will be adjusted to have a larger beam width. Conversely, if the average of the signal quality worsens over a period of time, then the antenna 102 will be adjusted to have a smaller beam width. It should be noted that when executing the adjustment of beam width of an antenna, although the processing circuit 106 can adjust the beam width of the antenna 102 according to formula 1, the processing circuit 106 can also determine the beam width of the antenna 102 according to other linear or non-linear mapping function related to the signal quality index $Q_i$ and/or the altitude measurement value $H_i$.

Figure 6:
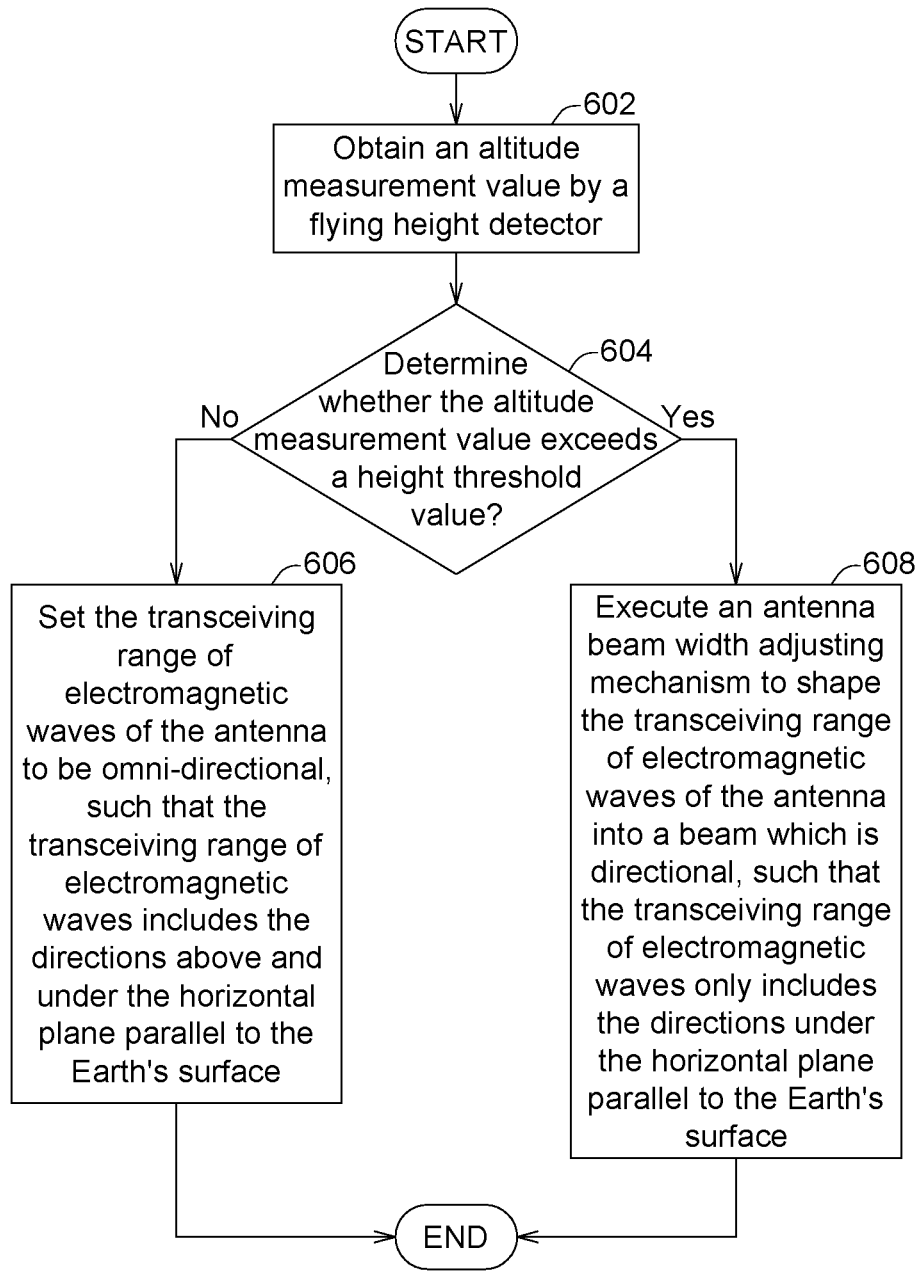
FIG. 6 shows flowchart of a mobile communication method according to according to an embodiment of the present invention.

FIG. 6 shows flowchart of a mobile communication method according to according to an embodiment of the present invention. The mobile communication method can be executed by the communication terminal device 100 of FIG. 1.

In step 602, an altitude measurement value adapted to specify the flying height of the aerial vehicle is obtained by the altimeter 104 of the communication terminal device 100.

In step 604, whether the altitude measurement value exceeds a height threshold value is determined by the processing circuit 106 of the communication terminal device 100.

In step 606, the transceiving range of electromagnetic waves of the antenna 102 is set to be omni-directional by the processing circuit 106 in response to determining that the altitude measurement value does not exceed the height threshold value, such that the transceiving range of electromagnetic waves includes the directions above and under the horizontal plane parallel to the Earth's surface.

In step 608, an antenna beam width adjusting mechanism is executed by the processing circuit 106 to shape the transceiving range of electromagnetic waves of the antenna 102 into a beam which is directional in response to determining that the altitude measurement value exceeds the height threshold value, such that the transceiving range of electromagnetic waves only includes the directions under the horizontal plane parallel to the Earth's surface.

According to the communication terminal device applicable to an aerial vehicle and the mobile communication method using the same disclosed in above embodiments, the communication terminal device can execute an antenna beam width adjusting mechanism when the altitude measurement value is larger than or equivalent to a height threshold value. During the execution of the antenna beam width adjusting mechanism, the transceiving range of electromagnetic waves of the antenna switches to a directional beam having a specific beam width from an omni-directional field type, and the beam width can further be dynamically adjusted according to the altitude of the aerial vehicle and/or the signal quality index of signal reception of the communication terminal device to reduce or avoid signal interference caused by neighboring or remote base stations.

While the invention has been described by way of example and in terms of embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication terminal device applicable to an aerial vehicle and configured to perform wireless communication with a terrestrial mobile communication network, the communication terminal device comprises:
    an antenna configured to provide a transceiving range of electromagnetic waves;
    an altimeter configured to obtain an altitude measurement value adapted to specify a flying height of the aerial vehicle;
    a processing circuit coupled to the antenna and the altimeter and configured to:
        determine whether the altitude measurement value exceeds a height threshold value;
        set the transceiving range of electromagnetic waves of the antenna to be omni-directional in response to determining that the altitude measurement value does not exceed the height threshold value, such that the transceiving range of electromagnetic waves comprises directions above and under a horizontal plane parallel to the Earth's surface; and
        execute an antenna beam width adjusting mechanism to shape the transceiving range of electromagnetic waves of the antenna into a beam which is directional in response to determining that the altitude measurement value exceeds the height threshold value, such that the transceiving range of electromagnetic waves only comprises directions under the horizontal plane parallel to the Earth's surface;
    wherein the processing circuit is further configured to:
        obtain a signal quality index of signal reception of the communication terminal device;
    wherein the antenna beam width adjusting mechanism comprises:
        adjusting a size of a beam width of the beam according to the signal quality index;
        reducing the beam width in response to the signal quality index satisfying a first condition and the beam width being not yet reduced to a limit of a reducible range; and
        expanding the beam width in response to the signal quality index satisfying a second condition and the beam width being not yet expanded to a limit of an expandable range.

2. The communication terminal device according to claim 1, wherein the antenna beam width adjusting mechanism comprises:
    adjusting a size of a beam width of the beam according to the altitude measurement value.

3. The communication terminal device according to claim 2, wherein the antenna beam width adjusting mechanism further comprises:
    comparing a first altitude measurement value corresponding to a first time point with a second altitude measurement value corresponding to a second time point, wherein the second time point is earlier than the first time point;
    reducing the beam width in response to the first altitude measurement value being larger than the second altitude measurement value and the beam width being not yet reduced to a limit of a reducible range; and
    expanding the beam width in response to the first altitude measurement value being smaller than the second altitude measurement value and the beam width being not yet expanded to a limit of an expandable range.

4. The mobile communication device method according to claim 3, wherein the antenna beam width adjusting mechanism further comprises:
    maintaining the beam width unchanged in response to the first altitude measurement value being equivalent to the second altitude measurement value.

5. The communication terminal device according to claim 1, wherein the first condition refers to the signal quality index being lower than a threshold lower limit, and the second condition refers to the signal quality index being higher than a threshold upper limit.

6. The communication terminal device according to claim 5, wherein the antenna beam width adjusting mechanism further comprises:
    adjusting at least one of the threshold lower limit and the threshold upper limit in response to a change in an adjustment request of the communication terminal device.

7. A mobile communication method of a communication terminal device applicable to an aerial vehicle and configured to perform wireless communication with a terrestrial mobile communication network through an antenna, the mobile communication method comprises:
    obtaining an altitude measurement value adapted to specify a flying height of the aerial vehicle;
    determining whether the altitude measurement value exceeds a height threshold value;
    setting a transceiving range of electromagnetic waves of the antenna to be omni-directional in response to determining that the altitude measurement value does not exceed the height threshold value, such that the transceiving range of electromagnetic waves comprises directions above and under a horizontal plane parallel to the Earth's surface; and
    executing an antenna beam width adjusting mechanism to shape the transceiving range of electromagnetic waves of the antenna into a beam which is directional in response to determining that the altitude measurement value exceeds the height threshold value, such that the transceiving range of electromagnetic waves only comprises directions under the horizontal plane parallel to the Earth's surface;

wherein the mobile communication method further comprises:
obtaining a signal quality index of signal reception of the communication terminal device; wherein the antenna beam width adjusting mechanism comprises:
adjusting a size of a beam width of the beam according to the signal quality index;
reducing the beam width in response to the signal quality index satisfying a first condition and the beam width being not yet reduced to a limit of a reducible range; and
expanding the beam width in response to the signal quality index satisfying a second condition and the beam width being not yet expanded to the limit of an expandable range.

8. The mobile communication method according to claim 7, wherein the antenna beam width adjusting mechanism comprises:
adjusting a size of a beam width of the beam according to the altitude measurement value.

9. The mobile communication method according to claim 8, wherein the antenna beam width adjusting mechanism further comprises:
comparing a first altitude measurement value corresponding to a first time point with a second altitude measurement value corresponding to a second time point, wherein the second time point is earlier than the first time point;
reducing the beam width in response to the first altitude measurement value being larger than the second altitude measurement value and the beam width being not yet reduced to a limit of a reducible range; and
expanding the beam width in response to the first altitude measurement value being smaller than the second altitude measurement value and the beam width being not yet expanded to a limit of an expandable range.

10. The mobile communication method according to claim 9, wherein the antenna beam width adjusting mechanism further comprises:
maintaining the beam width unchanged in response to the first altitude measurement value being equivalent to the second altitude measurement value.

11. The mobile communication method according to claim 7, wherein the first condition refers to the signal quality index being lower than a threshold lower limit, and the second condition refers to the signal quality index being higher than a threshold upper limit.

12. The mobile communication method according to claim 11, wherein the antenna beam width adjusting mechanism further comprises:
adjusting at least one of the threshold lower limit and the threshold upper limit in response to a change in an adjustment request of the communication terminal device.

* * * * *